Figure 3:
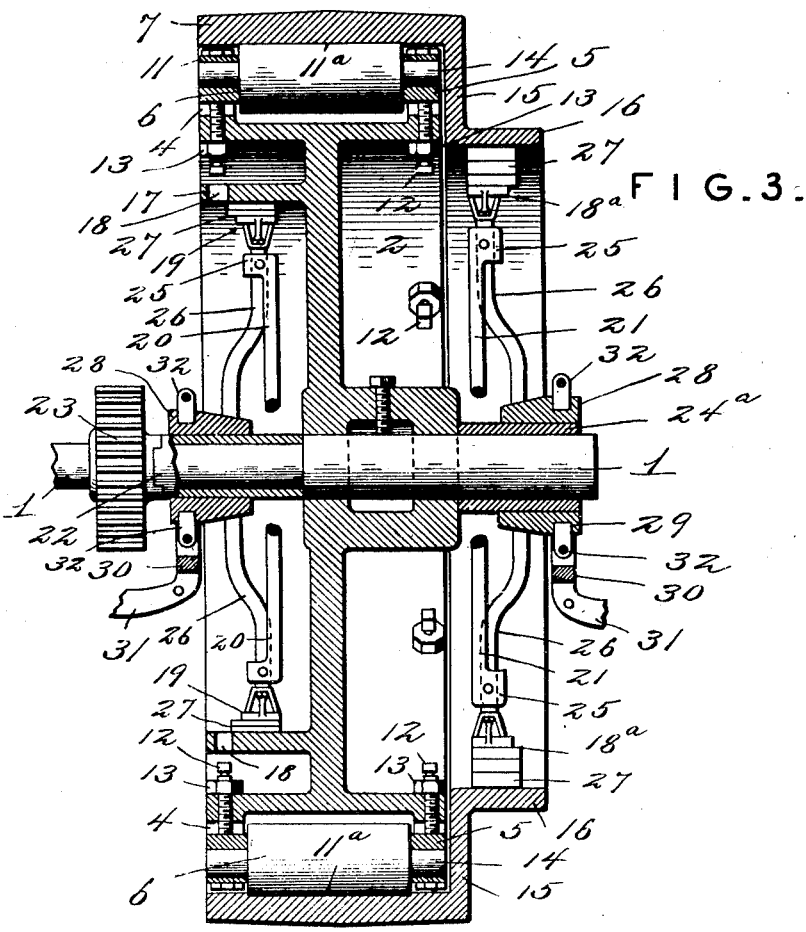

No. 737,477. PATENTED AUG. 25, 1903.
J. F. RADEBAUGH.
FLY WHEEL.
APPLICATION FILED MAR. 8, 1902.
NO MODEL. 2 SHEETS—SHEET 1.
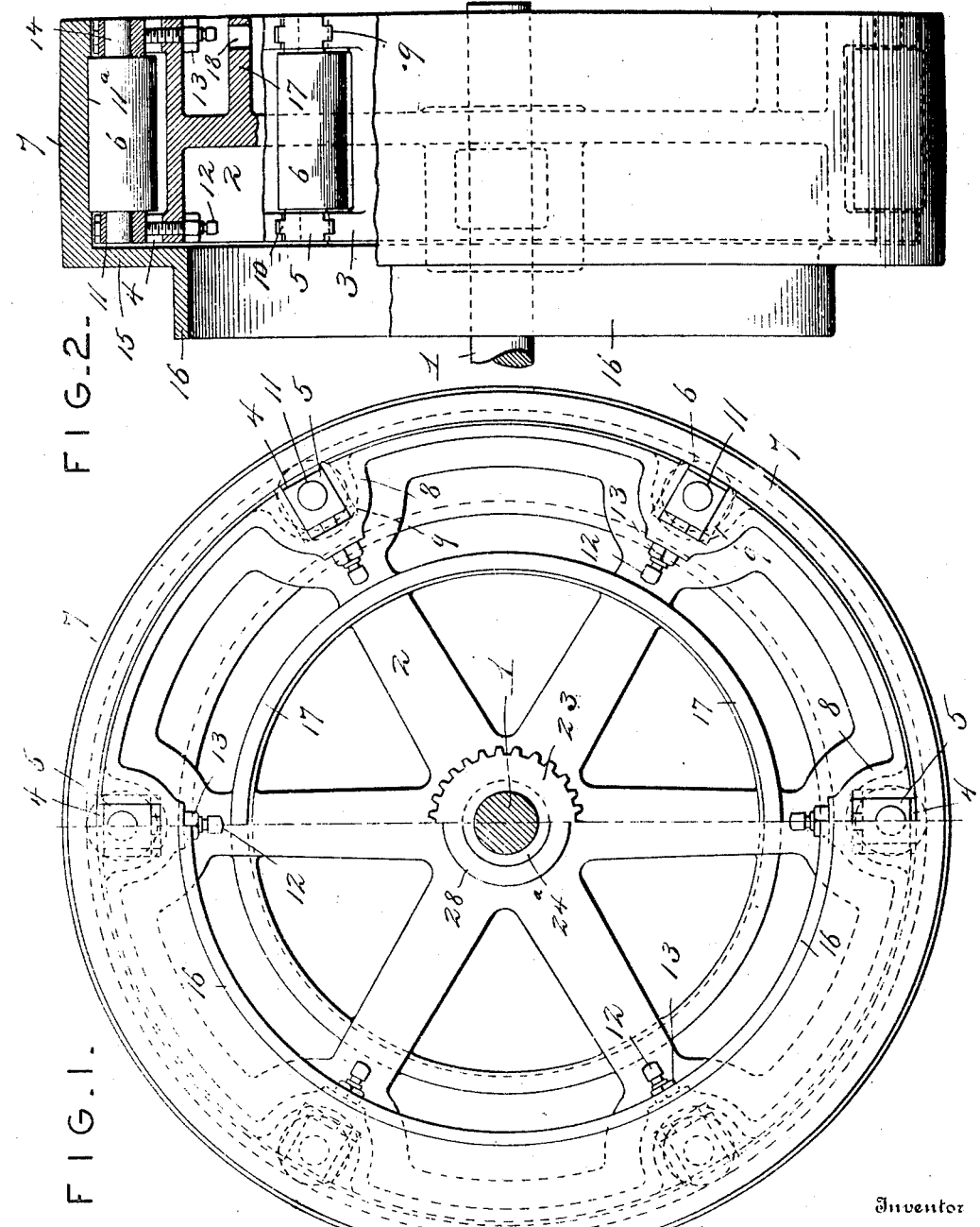
Witnesses
Harry L. Ames
John H. Byrne
Inventor
Joseph F. Radebaugh,
By Victor J. Evans
Attorney No. 737,477. PATENTED AUG. 25, 1903.
J. F. RADEBAUGH.
FLY WHEEL.
APPLICATION FILED MAR. 8, 1902.
NO MODEL. 2 SHEETS—SHEET 2.

Witnesses:
Harry L. Amer.
John F. Byrne.

Inventor
J. F. Radebaugh.
By Victor J. Evans
Attorney

No. 737,477. Patented August 25, 1903.

UNITED STATES PATENT OFFICE.

JOSEPH F. RADEBAUGH, OF DANVILLE, ILLINOIS.

FLY-WHEEL.

SPECIFICATION forming part of Letters Patent No. 737,477, dated August 25, 1903.

Application filed March 8, 1902. Serial No. 97,383. (No model.)

*To all whom it may concern:*

Be it known that I, JOSEPH F. RADEBAUGH, a citizen of the United States, residing at Danville, in the county of Vermilion and State of Illinois, have invented certain new and useful Improvements in Fly-Wheels, of which the following is a specification.

My invention relates to fly-wheels, more particularly to those used in connection with traction-engines, and has for its object the production of a device of this character adapted to receive a pulley to permit of the fly-wheel and pulley having mutual independent rotations.

A further object of the invention is to provide the pulley with means adapted to be engaged by a clutch carried by the crank-shaft of a traction-engine to impart rotation thereto.

A still further object of my invention is to provide the fly-wheel with an antifriction-surface of a new and improved character, whereby the mutual independent rotations of the fly-wheel and pulley are facilitated.

It will appear that the invention has further objects in view as the nature of the same is more fully understood from the following description, taken in connection with the accompanying drawings, forming a part of this specification.

In the drawings, Figure 1 is a sectional elevation of one-half of one side of the pulley and one-half of the opposite side of the fly-wheel looking in opposite directions, the clutch members being removed. Fig. 2 is an end elevation thereof, part being in section. Fig. 3 is a central vertical sectional view of the device, the clutch members being in elevation.

1 designates the crank-shaft of a traction-engine, upon which is keyed to rotate therewith a fly-wheel 2, the periphery thereof being provided with flanges 3, having a plurality of recessed pockets 4, in which are adjustably mounted bearing-blocks 5. The bearing-blocks carry antifriction-rollers 6 to provide the fly-wheel with an antifriction-surface upon which is mounted a pulley 7 to permit the fly-wheel and pulley having mutual independent rotations. The flanges 3 have adjacent the pockets 4 approximately U-shaped reinforcements 8 to increase the thickness of the flanges at the pockets to permit the same being provided with grooves 9 without liability of reducing the strength of the flanges adjacent the pockets.

The bearing-blocks 5 are adjustable through the medium of tongues 10, movably mounted in the grooves 9, so that the rollers carried thereby may be moved to place their peripheries in circumferential alinement corresponding to the inner periphery of the pulley 7 to provide the fly-wheel with an uninterrupted antifriction-surface to give to the pulley and fly-wheel a freedom of movement obviating any liability of the pulley having imparted thereto an unauthorized motion by the fly-wheel. The bearing-blocks are provided with suitable bearings 11 for the reception of gudgeons 14, projecting laterally from the rollers 6, to journal the rollers thereon. Adjusting-screws 12 are carried by the reinforcements to place their inner ends in contact with the bearing-blocks, whereby in a manner that is obvious the bearing-blocks may be moved in the pockets to bring the peripheries of the rollers into circumferential alinement. Nuts 13 are carried by the screws 12 and adapted to bear upon the under side of the fly-wheel to bind the screws in their sockets to obviate all liability of their working loose.

The pulley 7 has the inner face thereof recessed to provide a raceway 11$^a$ for the reception of the rollers 6, the outer ends of which abut against the shoulders formed by the recess and prevent a lateral movement of the pulley upon the fly-wheel. The pulley is provided with a flange 15, having extending therefrom a horizontally-disposed frictional flange 16, adapted to coact with a clutch carried by the crank-shaft 1 to cause the pulley to rotate therewith.

The fly-wheel is provided with a friction-flange 17, situated on the opposite side to that of the flange 16 and in engagement with which a clutch is adapted to be forced to cause the crank-shaft to set in motion the traction-gear. The flange 17 is provided at points in alinement with the screws 12 with apertures 18, adapted to permit of the screws passing therethrough when being inserted in applied position and also to permit of the ends of the screws fitting therein when decreasing the circumference of the rollers 6 to permit of the pulley being removed from its applied position.

The crank-shaft 1 is provided at either side of the fly-wheel 2 with clutches 18ª and 19, adapted to be forced into engagement with the flanges 16 and 17, respectively, to either impart rotation to the pulley 7 or to set in motion the train of traction-gears. The clutches are substantially alike in construction, and the numerals 20 and 21 designate spiders loosely and rigidly mounted upon the shaft 1, respectively. The spider 20 is provided at its lower end with an extended hub 22, loosely mounted upon the axle 1 and having its inner end notched to engage with a corresponding reversely-notched hub of a loose initial member 23 of a train of traction-gears (not shown) to impart motion to a traction-wheel when the friction-shoes of the clutch 19 are forced into engagement with the friction-flange 17 of the fly-wheel. The spider 21 is also provided with a hub (designated 24ª) adapted to be received by the crank-shaft 1 and through which may pass to engage the crank-shaft fastening means to rigidly secure the clutch 18ª thereon. The spiders 20 and 21 are provided at their upper ends with sleeves 25, in which are slidably mounted for radial movement rods 26, carrying on their outer ends friction-shoes 27.

Slidably mounted on the hubs 22 and 24ª to rotate therewith are shipper-collars 28, having their outer faces reversely inclined and their outer ends provided with channels 29. The lower ends of the rods 26 are outwardly and downwardly bent to place their extremities, which are beveled in opposite directions to the inclination of the collars 28, in contact with the inclined faces of said collars, so that when the collars are moved toward the fly-wheel the rods are forced outward to bring in contact with the flanges 16 and 17 the shoes 27. The collars 28 are operated through the medium of bell-crank shipper-levers 30, pivoted to suitable brackets which may be carried by the engine-boiler. To the long arms 31 of the bell-crank shipper-levers may be secured suitable operating-rods, extending to a point within convenient reach of the engineer. Secured to the shipper-levers are pivotally-mounted fingers 32, having their free ends projecting into the channels 29 in order that when the shipper-levers are operated the collars 28 are caused to move. It will be perceived that when either one of the shipper-levers of the clutches 18ª or 19 are operated to cause one of the collars to move toward the fly-wheel the friction-shoes are either forced into engagement with the flanges 16 or 17, thereby either causing the pulley to rotate or to impart rotation to the traction-gear.

The clutches, the hub 22, and the loose initial member 23 above described are of a common form in general use, and therefore a further extended description is deemed unnecessary.

The application of a belt to a fly-wheel of my improved construction and to the pulley of the mechanism of a threshing-machine for the purpose of imparting motion to the latter may be explained as follows: The fly-wheel of the traction-engine being free to rotate independently of the pulley, the traction-engine may be propelled a distance sufficiently near the threshing-machine to permit of the belt being freely applied, and then the traction-engine may be propelled away from the engine to give to the belt sufficient tension. When the belt has applied thereto sufficient tension, the traction-engine is stopped and the friction-shoes of the clutch 18ª withdrawn from engagement with the flange 17, thereby throwing the train of traction-gear out of operation. The next step will be to force into engagement with the flange 16 the friction-shoes of the clutch 18ª, thereby causing the pulley to rotate to impart motion to the threshing-machine mechanism through the medium of the belt. The pulley through the virtue of its being loosely mounted upon the fly-wheel permits of the piston being brought to its proper quarter-stroke before throwing the friction-shoes into engagement with the flange 16 to cause the pulley to rotate.

Having thus fully described the invention, what is claimed as new is—

1. In a device of the character described, the combination with a drive-shaft, of a fly-wheel fastened thereto, rollers mounted upon the fly-wheel and radially adjustable thereon, a pulley rotatably mounted upon the rollers whereby the members are mutually independent, and means for imparting rotation to the pulley.

2. In a device of the character described, the combination with a drive-shaft, of a fly-wheel fastened thereto, bearing-blocks carried by the fly-wheel, rollers journaled in the bearing-blocks, a pulley mounted upon the rollers whereby the fly-wheel and pulley have mutually-independent rotation, and means for imparting rotation to the pulley.

3. In a device of the character described, the combination with a drive-shaft, of a fly-wheel fastened thereto, bearing-blocks adjustably mounted upon the fly-wheel, rollers journaled in the bearing-blocks, a pulley mounted upon the rollers whereby the fly-wheel and pulley have mutually-independent rotation, and means for imparting rotation to the pulley.

4. In a device of the character described, the combination with a drive-shaft, of a fly-wheel fastened thereto and provided with flanges, rollers mounted upon the flanges and radially adjustable thereon, a pulley rotatably mounted upon the rollers whereby the fly-wheel and pulley may have mutually-independent rotation, and means for imparting rotation to the pulley.

5. In a device of the character described, the combination with a drive-shaft, of a fly-wheel fastened thereto and provided with flanges, rollers mounted upon the flanges and radially adjustable thereon, means for adjusting the rollers, a pulley rotatably mounted upon the rollers whereby the fly-wheel and pulley have mutually-independent rotation, and means for imparting rotation to the pulley.

6. In a device of the character described, the combination with a drive-shaft, of a fly-wheel fastened thereto, rollers carried by the fly-wheel, a pulley mounted upon the rollers whereby the fly-wheel and pulley have mutually-independent rotation, said pulley being provided with a recess for the reception of the rollers, thereby preventing the lateral displacement of the pulley, and means for imparting rotation to the pulley.

7. In a device of the character described, the combination with a drive-shaft, of a fly-wheel fastened thereto and provided with a flange, a clutch carried by the shaft and adapted to be forced into engagement with the flange, a pulley carried by the fly-wheel in a manner to enable the fly-wheel and pulley to have mutually-independent rotation, said pulley being provided with a flange, and a clutch carried by the shaft and adapted to have engagement with the pulley's flange to cause the pulley to rotate.

8. In a device of the character described, the combination with a drive-shaft, of a fly-wheel fastened thereto, bearing-blocks adjustably mounted upon the fly-wheel, means for adjusting the bearing-blocks, rollers journaled in the bearing-blocks, a pulley rotatably mounted upon the rollers whereby the pulley and fly-wheel have mutually-independent rotation, and means for imparting rotation to the pulley.

9. In a device of the character described, the combination with a drive-shaft, of a balancing member mounted thereon, a radially-adjustable antifriction device carried by the balancing member, and a belt-carrying member rotatably mounted upon the antifriction device to permit of the members having mutual independence.

10. In a device of the character described, the combination with a drive-shaft, of a balancing member mounted thereon, a radially-adjustable antifriction device carried by the balancing member, a belt-carrying member rotatably mounted upon the antifriction device whereby the members are mutually independent, and means for causing the belt-carrying member to rotate.

In testimony whereby I affix my signature in presence of two witnesses.

JOSEPH F. RADEBAUGH.

Witnesses:
   FRED DRAPER,
   CHAS. HARBAUGH.